United States Patent
Harms et al.

(10) Patent No.: US 8,080,890 B2
(45) Date of Patent: Dec. 20, 2011

(54) METHOD FOR THE OPERATION OF A WIND TURBINE AND WIND TURBINE USING THIS METHOD

(75) Inventors: Ulrich Harms, Hamburg (DE);
Wolfgang Kabatzke, Geesthacht (DE)

(73) Assignee: Nordex Energy GmbH, Norderstedt (DE)

( * ) Notice: Subject to any disclaimer, the term of this patent is extended or adjusted under 35 U.S.C. 154(b) by 405 days.

(21) Appl. No.: 12/474,039

(22) Filed: May 28, 2009

(65) Prior Publication Data
US 2010/0225113 A1    Sep. 9, 2010

(30) Foreign Application Priority Data
Mar. 3, 2009 (DE) .................... 10 2009 011 425

(51) Int. Cl.
*H02P 9/04* (2006.01)

(52) U.S. Cl. ....................................................... 290/44

(58) Field of Classification Search .................... 290/44, 290/55
See application file for complete search history.

(56) References Cited

U.S. PATENT DOCUMENTS

| 4,656,362 A * | 4/1987 | Harner et al. ................. 290/44 |
| 2009/0162202 A1* | 6/2009 | Nies et al. ..................... 416/147 |
| 2009/0250932 A1* | 10/2009 | Egedal ........................... 290/44 |
| 2011/0089693 A1* | 4/2011 | Nasiri ............................ 290/44 |

FOREIGN PATENT DOCUMENTS
DE    10 2007 007 872 A1    8/2008
* cited by examiner

*Primary Examiner* — Nguyen N Hanh
(74) *Attorney, Agent, or Firm* — Vidas, Arrett & Steinkraus, P.A.

(57) ABSTRACT

A method for the operation of a wind turbine comprising a rotor with at least one rotor blade, a generator and a speed regulator for regulating the rotational speed of a drive train element by adjusting a generator torque and/or a blade pitch angle, comprising the steps of: determining the angular speed of the drive train element through the time derivative of an angular position signal, determining the angular acceleration of the drive train element, presetting desired values for the generator torque and/or the blade pitch angle taking into account the angular speed of the drive train element and the angular acceleration of the drive train element, wherein the angular acceleration of the drive train element is determined from the angular position signal, wherein a filtering with an upper cut off frequency is performed after the first time derivative of the angular position signal and before a second time derivative of the angular position signal, said upper cut off frequency being tuned to a maximum adjustment speed of the generator torque and/or of the blade pitch angle.

12 Claims, 1 Drawing Sheet

METHOD FOR THE OPERATION OF A WIND TURBINE AND WIND TURBINE USING THIS METHOD

CROSS-REFERENCE TO RELATED APPLICATIONS

Figure 1:
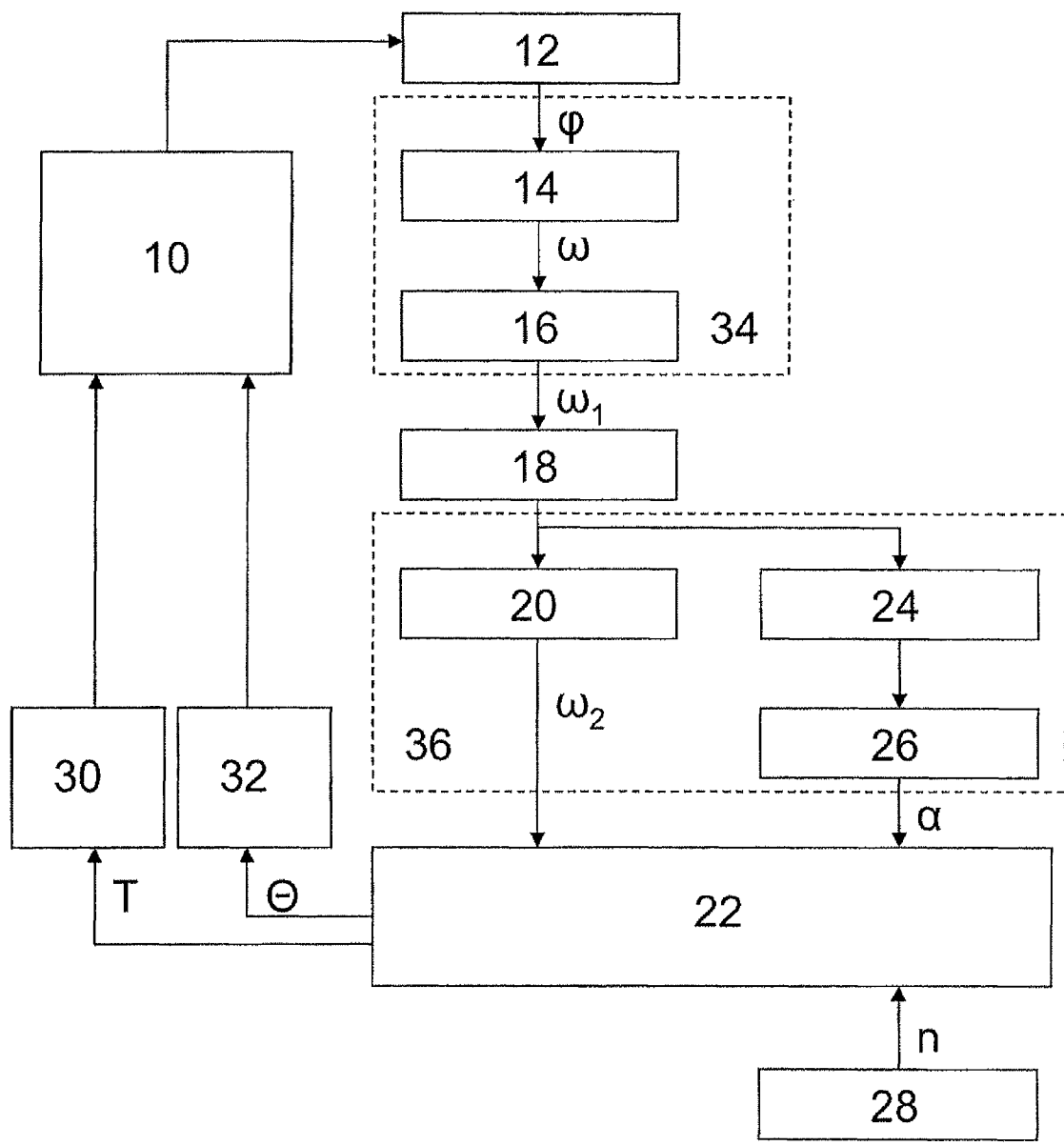

Not applicable.

STATEMENT REGARDING FEDERALLY SPONSORED RESEARCH

Not applicable.

BACKGROUND OF THE INVENTION

The present invention is related to a method for the operation of a wind turbine, which features a rotor with at least one rotor blade, a generator and a speed regulator for regulating the rotational speed of a drive train element by adjusting a generator torque and/or a blade pitch angle. In the method, an angular speed of the drive train element, which corresponds to the rotational speed of the drive train element, is determined through the time derivative of an angular position signal. An angular acceleration of the drive train element is determined in addition. Besides to this, desired values for the generator torque and/or the blade pitch angle are preset, taking into account the angular speed of the drive train element and the angular acceleration of the drive train element.

Including the determined angular acceleration of the drive train element, for instance of the rotor hub, into the regulation of the rotational speed has the advantage that it is possible to react more quickly to changes of the rotational speed. The dynamic behaviour of the regulation is improved in this way. For instance, it is possible to detect a sudden increase of the rotational speed of the drive train element quickly by means of the acceleration signal, and to counter-act the same through an adequate regulation intervention, e.g. before a desired value for the rotational speed of the drive train element is actually in fact exceeded.

By way of example, such a method is known from the document DE 10 2007 007 872 A1, the entire contents of which is incorporated herein by reference, wherein three acceleration sensors arranged in the rotor are provided in order to determine the angular acceleration of the rotor. The angular acceleration of the rotor is calculated from the acceleration values measured by these acceleration sensors.

BRIEF SUMMARY OF THE INVENTION

Starting from this, it is the objective of the present invention to provide a method for the operation of a wind turbine which can be executed by simple means and in which the rotational speed regulation features a good dynamic behaviour. It is also an objective of the present invention to provide a wind turbine, which can execute said method. The objective is achieved by the inventive method and by the wind turbine.

The method of the present invention serves for the operation of a wind turbine, which features a rotor with at least one rotor blade, a generator and a speed regulator for regulating the rotational speed of a drive train element by adjusting a generator torque and/or a blade pitch angle, the method having the following steps: determining the angular speed of the drive train element through the time derivative of an angular position signal, determining the angular acceleration of the drive train element, presetting desired values for the generator torque and/or the blade pitch angle, taking into account the angular speed of the drive train element and the angular acceleration of the drive train element, wherein the angular acceleration of the drive train element is determined from the angular position signal, and a filtering with an upper cut off frequency is performed after the first time derivative of the angular position signal and before a second time derivative of the angular position signal, said upper cut off frequency being tuned to a maximum adjustment speed of the generator torque and/or of the blade pitch angle.

An assembly unit consisting of a rotor hub, rotor shaft, gearbox, coupling, generator shaft and generator is usually designated as a drive train. The drive train element on which the present invention is based may be in particular the rotor shaft, a gearbox shaft (rotating slowly or rapidly), the coupling or the generator shaft or another rotating element of the drive train.

Like in the document mentioned above, the angular acceleration of the drive train element is taken into account in the present invention, in order to optimize the dynamic behaviour of the rotational speed regulation. In contrast to the known method, however, no separate sensors are necessary to determine the angular acceleration, but the angular acceleration is determined from an angular position signal instead. For this reason, the method of the present invention can be executed with little expenditure with respect to apparatus. At the same time, it is also less interference-prone through this.

The present invention is based on the finding that it is possible to determine the angular acceleration from the signal of a conventional angular position sensor, e.g. an incremental rotary encoder, in spite of a possibly bad quality of such an angular position signal. The known errors and interferences of the angular position signal are due to inevitable quantisation errors on the one hand, which are caused by the digital nature of conventional incremental rotary encoders. On the other hand, interference signals are generated e.g. by installation tolerances and tooth engagement frequencies of the gearbox. All these interference influences are amplified in the calculation of the twofold derivative with respect to time of the angular position signal, which is necessary for the calculation of the angular acceleration, so that an angular acceleration signal calculated in this way is normally unusable. Experiments have shown that suitable signal processing actions can be implemented, in spite of the high requirements of the regulation with respect to the quality of the angular acceleration signal, making it possible to determine the angular acceleration from the angular position signal.

In particular, it has turned out that a filtering of the angular position signal after the first time derivative thereof, i.e. of a signal representing the angular speed, is necessary with an upper cut off frequency which is tuned to a maximum adjustment speed of the generator torque and/or of the blade pitch angle. After this filtering action, the second time derivative of the signal can be performed in order to determine the angular acceleration. Through the filtering with the upper cut off frequency mentioned above, high frequency components of the angular position signal are filtered out. These would otherwise result in high frequency fluctuations of the angular acceleration signal. By said tuning of the upper cut off frequency of the filtering, in particular those frequency components are filtered out, which are undesired for the intended regulation interventions by providing the desired values for the generator torque and/or the blade pitch angle. For instance, the upper cut off frequency may be smaller than a characteristic frequency of the drive train element of e.g. 2 Hertz. In this case, the pitch drive is not charged with control signals due to drive train oscillations, which it cannot follow up permanently.

The upper cut off frequency being tuned to the maximum adjustment speed of the blade pitch angle and/or the generator torque means that based on the known dynamic behaviour of the blade pitch control system, or of a converter presetting the generator torque, respectively, it is determined at which maximum frequency a regulation intervention is to be performed. The upper cut off frequency of the filtering is selected corresponding to this frequency. By doing so, it is made sure on the one hand that the improvement of the dynamic behaviour is completely utilised in a manner adapted to the performance of the blade pitch control system or the presetting of torque, respectively. On the other hand, interference components having higher frequencies are efficiently suppressed, so a further processing of the angular acceleration signal is stably possible in the rotational speed regulator.

In one embodiment of the method, before a time-discrete transmission of the angular speed signal, the same is filtered with an upper cut off frequency, which is smaller than half the sampling frequency of the signal. By this embodiment, a digital transmission of the angular speed signal—e.g. from an angular position sensor on the rotor shaft or on a shaft of the gearbox to a central control unit—can take place without additional interference signals occurring due to aliasing effects.

In a further embodiment, a low-pass filter of at least second order is used for filtering after the first time derivative and before the second time derivative of the angular position signal and/or for filtering before the time-discrete transmission of the angular speed signal. In a filtering with this edge steepness, a disproportionately high lowering of interferences is achieved towards higher frequencies. In this way, the quality of the angular acceleration signal can be improved.

In one embodiment, the first time derivative of the angular position signal and/or the filtering after the first time derivative of the angular position signal and before the second time derivative of the angular position signal is performed in the converter which adjusts a generator torque. Through this spatial integration of the mentioned signal processing steps in the converter, the dynamic behaviour of the regulation with respect to the generator torque presetting can be further improved. Moreover, a synergy effect results because the generator's rotational speed or a value representing the same is normally needed in the converter anyway, independent from the method of the present invention.

In one embodiment, the first time derivative of the angular position signal ($\phi$) and/or the filtering after the first time derivative of the angular position signal ($\phi$) and before a second time derivative of the angular position signal ($\phi$) is performed in or on a measurement device for measuring the angular position signal ($\phi$), e.g. within a rotary input type encoder working on the basis of the angular position. The same can be preferably arranged on the hub, in order to be affected by oscillations of the drive train element as little as possible.

According to one embodiment, the upper cut off frequency of the filtering in the converter is tuned to the maximum adjustment speed of the generator torque, and the maximum adjustment speed of the blade pitch angle is disregarded. A particularly good dynamic behaviour of the regulation can be achieved in this embodiment because the dynamics of the converter is used for presetting the generator torque, said dynamics being higher than that of the blade pitch control system. Inasmuch as the rotational speed adjustment takes place by presetting a generator torque, the full bandwidth of this closed-loop control system can be used.

The wind turbine of the present invention has: a rotor with at least one rotor blade, a generator, a measurement device for measuring an angular position of a drive train element, a device for determining an angular acceleration of the drive train element, a rotational speed regulator for regulating the rotational speed of the drive train element, which is adapted to preset desired values for the generator torque and/or the blade pitch angle, taking into account the angular speed of the drive train element and the angular acceleration of the drive train element, wherein the device for determining the angular acceleration of the drive train element features a first derivative stage, which can differentiate with respect to time the angular position signal, a first filtering stage, which can filter the angular position signal time-differentiated once by an upper cut off frequency which is tuned to a maximum adjustment speed of the generator torque and/or of the blade pitch angle, and a second derivative stage which can differentiate a second time with respect to time the angular position signal which had been time-differentiated once and filtered, in order to determine the angular acceleration of the drive train element.

The wind turbine of the present invention can perform the method which has been described in detail. It is obvious that in particular the device for determining the angular acceleration of the drive train element can be implemented in software, in a control unit of the wind turbine for instance. Accordingly, in particular numerical implementations for performing the respective signal processing steps can be used in the first and second derivative stages as well as in the filtering stage. However, a hardware implementation of the signal processing steps is also conceivable.

Multiple measurement devices may also be provided for measuring angular position signals. The same can measure the same or different angular positions, on different drive train elements in particular. It is also possible to combine multiple devices for the determination of angular accelerations, which determine the angular accelerations of different drive train elements and use them as a basis of the further procedural steps.

BRIEF DESCRIPTION OF THE FIGURE OF THE DRAWINGS

The method is explained in more detail below by means of an example of its realisation shown in a FIGURE. The single FIGURE shows the process flow in a simplified schematic view.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Elements of the drive train of a wind turbine are designated by 10 in the FIGURE. In particular, the box 10 comprises a rotor hub, a rotor shaft, a gearbox, a generator shaft, a coupling and a generator. The angular position sensor 12 is in connection to a rotating drive train element, for instance the rotor hub or the generator shaft, whose rotational speed it captures. If there is a gearbox in the drive train, the rotational speed may be captured at the rapidly and/or at the slowly rotating shaft. In the example, the angular position sensor 12 is a conventional incremental rotary encoder or an absolute rotary encoder. As illustrated in the FIGURE, the angular position sensor 12 supplies an angular position signal $\phi$.

The further processing of the angular position signal $\phi$ takes place within the devices 34, 36 for the determination of the angular speed and the angular acceleration of the drive train element. For instance, the devices 34, 36 can be implemented in the form of software modules in the main converter or in the control unit of the wind turbine. Alternatively, the device 34 may be a constituent part of the sensor 12. The device 36 can be integrated into the control unit. The angular position signal $\phi$ is the input variable for the device 34. The former is at first time-differentiated once in the first derivative stage 14. An angular speed signal $\omega$ is then provided at the output of the first derivative stage 14. This angular speed signal $\omega$ is filtered by an upper cut off frequency in the second filtering stage designated by 16, and afterwards it is designated by $\omega_1$. The filtered angular speed signal $\omega_1$ is digitally sampled and transmitted for further processing by the time-discrete transmission device 18. In this, the sampling is performed with a preset sampling frequency. In this, the upper cut off frequency of the filtering in the second filtering stage 16 is lower than half the sampling frequency.

The time-discrete transmission by the transmission device 18 is followed by a third filtering stage 20, which provides an angular speed signal $\omega_2$ for the further processing in the rotational speed regulator 22. Parallel to this, the angular speed signal coming from the transmission device 18 is supplied to the first filtering stage 24, in which the signal is filtered with an upper cut off frequency, which is tuned to the maximum adjustment speed of the generator torque and/or the blade pitch angle. The angular speed signal filtered in this way is again time-differentiated in the second derivative stage 26. The result of this derivative is the angular acceleration signal $\alpha$, which is also provided to the rotational speed regulator 22. As a further input variable, a desired value for the rotational speed n of the drive train element is applied to the rotational speed regulator 22, which is preset by a unit 28. The output variables of the rotational speed regulation provided by the rotational speed regulator 22 are desired values for the generator torque T and for the blade pitch angle $\theta$ of the rotor. These are input to the main converter 30 and the blade pitch angle regulator 32, respectively, where an adjustment of the generator torque and of the blade pitch angle take place according to the desired values.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind turbine comprising a rotor with at least one rotor blade, a generator and a speed regulator (22) for regulating the rotational speed of a drive train element by adjusting a generator torque (T) and/or a blade pitch angle ($\theta$), comprising the steps of: determining the angular speed ($\omega$) of the drive train element through the time derivative of an angular position signal ($\phi$), determining the angular acceleration ($\alpha$) of the drive train element, presetting desired values for said generator torque (T) and/or said blade pitch angle ($\theta$), taking into account the angular speed ($\omega$) of the drive train element and the angular acceleration ($\alpha$) of the drive train element, characterised in that the angular acceleration ($\alpha$) of the drive train element is determined from the angular position signal ($\phi$), wherein a filtering with an upper cut off frequency is performed after the first time derivative of the angular position signal ($\phi$) and before a second time derivative of the angular position signal ($\phi$), said upper cut off frequency being tuned to a maximum adjustment speed of said generator torque (T) and/or of said blade pitch angle ($\theta$).

2. A method according to claim 1, wherein before a time-discrete transmission of the angular speed signal ($\omega$), the same is filtered with an upper cut off frequency which is smaller than half the sampling frequency of the signal.

3. A method according to claim 1, wherein a low-pass filter of at least the second order is used for the filtering after the first time derivative of the angular position signal ($\phi$) and/or for the filtering before the time-discrete transmission of the angular speed signal ($\omega$).

4. A method according to claim 1, wherein the first time derivative of the angular position signal ($\phi$) and/or the filtering after the first time derivative of the angular position signal ($\phi$) and before a second time derivative of the angular position signal ($\phi$) is performed in the converter, which adjusts a generator torque (T).

5. A method according to claim 4, characterised in that the upper cut off frequency of the filtering in the converter is tuned to the maximum adjustment speed of the generator torque (T) and disregards the maximum adjustment speed of the blade pitch angle ($\theta$).

6. A method according to claim 1, characterised in that the first time derivative of the angular position signal ($\phi$) and/or the filtering after the first time derivative of the angular position signal ($\phi$) and before a second time derivative of the angular position signal ($\phi$) is performed in or on a measurement device for measuring the angular position signal ($\phi$).

7. A wind turbine with a rotor with at least one rotor blade, a generator, a measurement device for measuring an angular position ($\phi$) of a drive train element, a device (34, 36) for determining an angular acceleration ($\alpha$) of the drive train element, a rotational speed regulator (22) for regulating the rotational speed (n) of the drive train element, which is adapted to preset desired values for the generator torque (T) and/or the blade pitch angle ($\theta$), taking into account the angular speed ($\omega$) of the drive train element and the angular acceleration ($\alpha$) of the drive train element, characterised in that the device (34, 36) for determining the angular acceleration ($\alpha$)

of the drive train element comprises a first derivative stage (14) which can differentiate with respect to time the angular position signal ($\phi$), a first filtering stage (24) which can filter the angular position signal ($\phi$) time-differentiated once by an upper cut off frequency which is tuned to a maximum adjustment speed of the generator torque (T) and/or of the blade pitch angle ($\theta$), and a second derivative stage (26) which can differentiate a second time with respect to time the angular position signal ($\phi$) which has been time-differentiated once and filtered, in order to determine the angular acceleration ($\alpha$) of the drive train element.

8. A wind turbine according to claim 7, wherein there is a second filtering stage (16), which can filter the angular position signal ($\phi$) time-differentiated once by an upper cut off frequency which is smaller than half the sampling frequency of a time-discrete transmission stage (18), which can perform a time-discrete transmission of the once time differentiated angular position signal ($\phi$).

9. A wind turbine according to claim 7, wherein the first filtering stage (24) and/or the second filtering stage (16) comprise a low-pass filter of at least the second order.

10. A wind turbine according to claim 7, wherein the second filtering stage (16) and/or the first derivative stage (14) are implemented within a converter of said wind turbine, which can preset a generator torque (T) for the generator.

11. A wind turbine according to claim 10, wherein the upper cut off frequency of the first filtering stage (24) is tuned to the maximum adjustment speed of the generator torque (T) and the maximum adjustment speed of the blade pitch angle ($\theta$) is disregarded.

12. A wind turbine according to claim 7, wherein the second filtering stage (16) and/or the first derivative stage (14) are implemented within or on the measurement device for measuring the angular position signal ($\phi$).

* * * * *

UNITED STATES PATENT AND TRADEMARK OFFICE
Certificate

Patent No. 8,080,890 B2                                                                  Patented: December 20, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ulrich Harms, Hamburg (DE); Wolfgang Kabatzke, Geesthacht (DE); and Detlef Drossel, Norderstedt (DE).

Signed and Sealed this Ninth Day of April 2013.

RENEE S. LUEBKE
*Supervisory Patent Examiner*
Art Unit 2833
Technology Center 2800